May 8, 1962 A. DUERKSEN 3,033,521
MOBILE SUPPORT FOR A TIRE SPREADER
Original Filed May 31, 1957 2 Sheets-Sheet 2

INVENTOR.
Arnold Duerksen
BY
Webster & Webster
ATTYS.

United States Patent Office 3,033,521
Patented May 8, 1962

3,033,521
MOBILE SUPPORT FOR A TIRE SPREADER
Arnold Duerksen, Lodi, Calif., assignor to Super Mold Corporation of California, Lodi, Calif., a corporation of California
Original application May 31, 1957, Ser. No. 662,629, now Patent No. 2,977,092, dated Mar. 28, 1961. Divided and this application Dec. 27, 1960, Ser. No. 78,686
2 Claims. (Cl. 254—50.4)

This invention relates to equipment particularly designed for use in tire retreading shops, and which equipment includes spreading devices for the tires in order that they may be readily inserted into a retreading mold; the instant application being a division of my copending application, Serial No. 662,629, filed May 31, 1957, and now U.S. Patent No. 2,977,092.

The major object of this invention is to provide a mobile support for such a spreader, which support may not only be readily moved about the shop floor from one point to another, but is provided with means to enable the supported spreader to be adjusted to different levels. In this manner the spreader may be positioned so as to engage a tire supported on the floor in an upstanding position without having to lift the tire before being so engaged. The engaged tire may then be raised to whatever level may be necessary to horizontally aline the same with the retreading mold, which is customarily mounted at a fixed level.

It is also an object of the invention to provide a practical, reliable, and durable mobile support for a tire spreader, and one which will be exceedingly effective for the purpose for which it is designed.

These objects are accomplished by means of such structure and relative arrangement of parts as will fully appear by a perusal of the following specification and claims.

Figure 3:
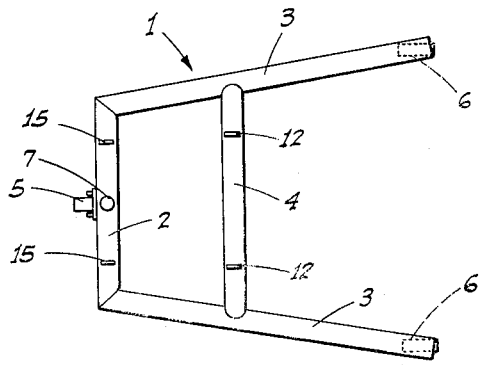
FIG. 3 is a top plan view, on a reduced scale, of the base or chassis portion of the support with the superstructure and spreader removed.

Referring now more particularly to the drawings, and to the characters of reference marked thereon, the mobile support includes a horizontal base frame, indicated generally at 1, and which—as shown particularly in FIG. 3—comprises a transverse rear end beam 2, side beams 3 rigidly connected to and diverging forwardly from the ends of beam 2, and an intermediate cross beam 4. The frame 1 is provided with a three-point support from the floor in the form of a centrally disposed caster wheel 5 mounted on the rear beam 2, and other caster wheels 6 mounted on the side beams 3 at their forward ends. A post 7 upstands from beam 2 centrally thereof to enable the frame to be manually moved and steered along a floor.

An elevator frame, indicated generally at 8, upstands from frame 1 adjacent and ahead of the cross beam 4; said frame 8 including transversely spaced side posts or rails 9 connected at their upper end by a cross bar 10. Posts 9 depend below beam 4 but terminate short of the floor, as shown.

The elevator frame 8 is swivelly supported from base frame 1 by means of ears 11 on and projecting rearwardly from posts 9 over the cross beam 4; cooperating ears 12 projecting upwardly from said beam 4 and being pivotally connected to ears 11, as at 13. To adjustably maintain the elevator frame against swinging about the pivots 13, diagonal stays 14 of adjustable length extend between and are connected to ears 15 on and upstanding from the rear cross beam 2 and to ears 16 projecting rearwardly from posts 9 some distance above the ears 11.

Figure 2:
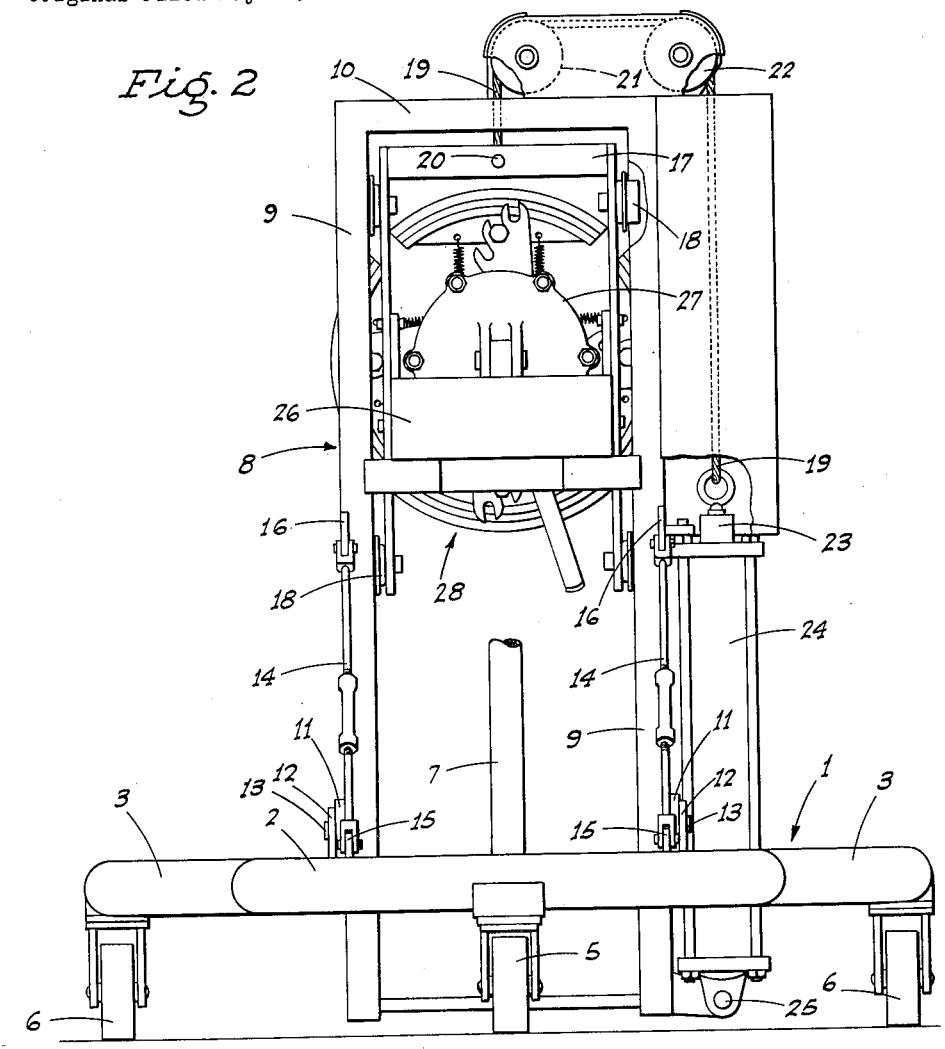
FIG. 2 is a rear end elevation of the structure, partly broken away.

An elevator carriage 17 (see FIG. 2) is movable up and down in the elevator frame, such carriage on opposite sides carrying vertically spaced rollers 18 which run in the posts 9, the latter being of inwardly opening channel form.

A suspension cable 19 is centrally connected to the top of the elevator carriage 17, as at 20, and extends thence upwardly and turns about direction-changing sheaves 21 and 22 mounted in transversely spaced relation on top of the elevator frame 8. From the sheave the cable 19 extends downwardly to connection with the free end of a piston rod 23 which projects upwardly from a power cylinder 24. This cylinder is mounted in connection with the adjacent side post 9 of the elevator frame 8, as shown at 25.

The power cylinder is controlled by a suitable valve-regulated fluid pressure conduit system (not shown), which is generally common in tire retreading shops. In this manner the carriage 17 may thus be selectively raised or lowered in the elevator frame 8.

The carriage 17 at the bottom is fitted with a horizontal bed 26 which projects both forwardly and rearwardly from the carriage; the bed supporting—in rigid relation therewith—a longitudinally extending power ram 27 on the forward end of which a tire spreader 28, such as is shown in said pending application Serial No. 662,629, is mounted.

Figure 1:
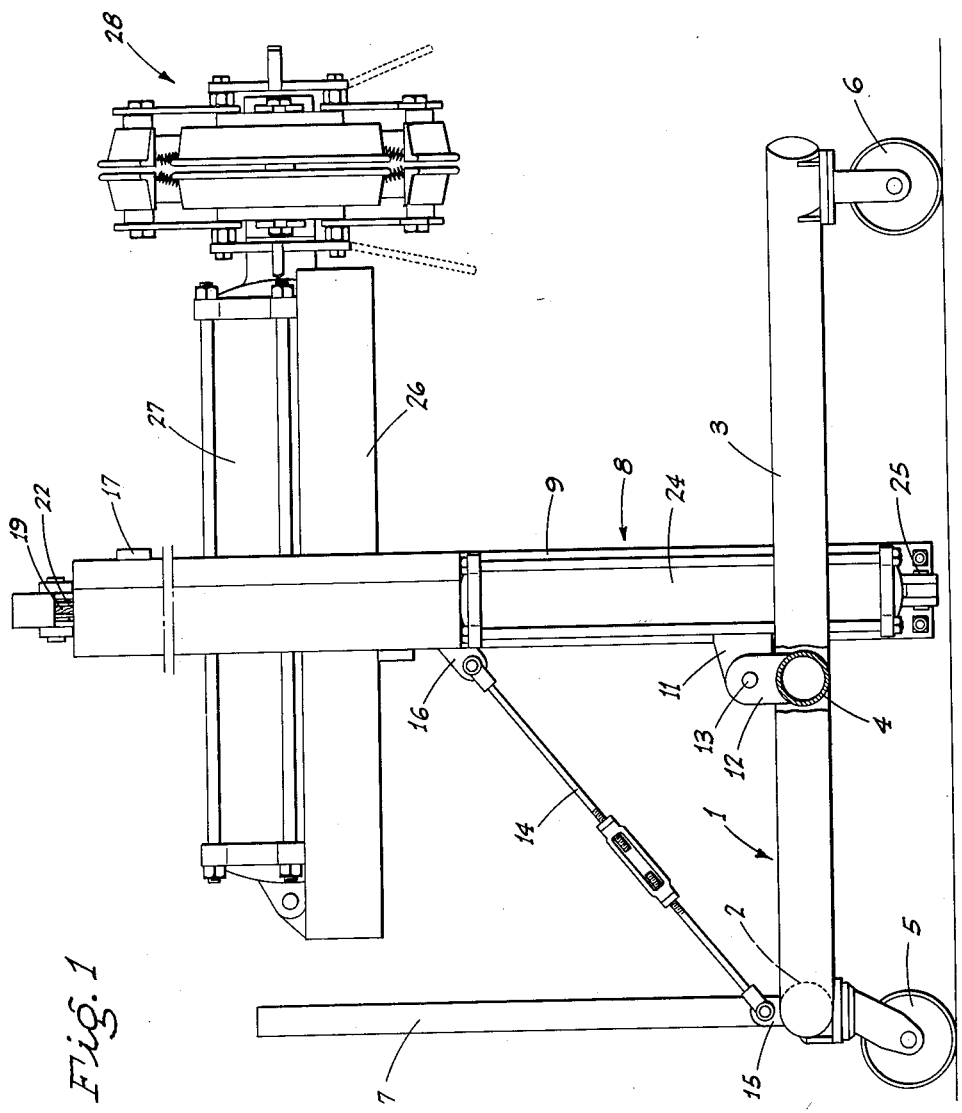
FIG. 1 is a side elevation of the improved mobile support, with a tire support mounted thereon.

When the ram is fully contracted the spreader is disposed partly to the rear of the front open end of the frame 1, as shown in FIG. 1. By reason of this feature, a tire in position to be initially mounted on the spreader from the floor, or removed from the spreader, may project between the side beams 3 of the frame 1 and rest on the floor while the mobile support, with the spreader in a lowered position, is being manipulated in a lengthwise direction in straddling relation to the tire. This avoids the necessity of the spreader projecting so far in front of the frame that such frame would tend to tip over forwardly or become unwieldy when carrying a heavy tire on the spreader. At the same time the structure as a whole is kept as short as possible for easy maneuvering in close quarters.

The raising and lowering means for the elevator carriage and spreader supported thereon being to one side of the elevator frame, nothing interferes with the lowering of the carriage to a point as close to the floor as may be necessary, and without the need of there being any upstanding sheave-supporting elements on the base frame to the rear of the elevator carriage and bed for the support of cable-training sheaves.

The elevator frame being adjustable as regards its setting relative to the perpendicular, the spreader may correspondingly be tilted to accurately aline it axially with a mold which may have a like tilt.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A mobile support for a tire spreader comprising a mobile floor-engaged frame which includes transversely spaced horizontal side beams the forward end portions of which are disconnected to provide a clear opening to the floor therebetween, and a vertically movable horizontal-axis tire supporting and spreading unit mounted on the frame in forwardly facing and overhanging relation to the opening; the spacing of the side beams at their forward ends being sufficient to enable the same to straddle an upstanding floor-supported tire and dispose the same in said opening in a plane transversely of the frame and in position to then receive the spreader unit therein when the latter is in a lowered position.

2. A mobile support for a tire spreader comprising a horizontal floor-engaged frame, an elevator frame upstanding from said horizontal frame including transversely spaced posts, a vertically movable carriage guided by the posts, said carriage incuding an elongated bed projecting both forwardly and rearwardly from between the posts and arranged to support a horizontal-axis tire supporting and spreading unit, means to move the carriage vertically including a cable connected to the cartridge at its upper end and upstanding therefrom, direction-changing sheaves on the top of the elevator frame over which the cable is then trained laterally and downwardly adjacent and laterally out from one post, and a device mounted on said one post laterally out therefrom and connected to the lower end of the cable to control the longitudinal movement thereof.

References Cited in the file of this patent

UNITED STATES PATENTS

| | | |
|---|---|---|
| 1,781,104 | De Lamar | Nov. 11, 1930 |
| 1,954,031 | Wood | Apr. 10, 1931 |
| 2,106,878 | Sinclair | Feb. 1, 1938 |